(12) United States Patent
Bernhard et al.

(10) Patent No.: US 8,081,602 B2
(45) Date of Patent: *Dec. 20, 2011

(54) SELECTING A HANDOVER ALGORITHM

(75) Inventors: Urs Peter Bernhard, Nuremberg (DE); Hai Zhou, Faringdon (GB)

(73) Assignee: Alcatel Lucent, Paris (FR)

( * ) Notice: Subject to any disclaimer, the term of this patent is extended or adjusted under 35 U.S.C. 154(b) by 478 days.

This patent is subject to a terminal disclaimer.

(21) Appl. No.: 11/554,645

(22) Filed: Oct. 31, 2006

(65) Prior Publication Data

US 2008/0101311 A1  May 1, 2008

(51) Int. Cl.
*H04W 4/00* (2009.01)

(52) U.S. Cl. ........ 370/331; 370/235; 370/328; 455/436; 455/437; 455/450

(58) Field of Classification Search .................. 370/331, 370/332; 455/436–444

See application file for complete search history.

(56) References Cited

U.S. PATENT DOCUMENTS

| | | | | |
|---|---|---|---|---|
| 6,061,337 | A * | 5/2000 | Light et al. | 370/331 |
| 6,112,093 | A * | 8/2000 | Nordlund | 455/450 |
| 7,139,575 | B1 * | 11/2006 | Chen et al. | 455/437 |
| 7,437,160 | B2 * | 10/2008 | Hamalainen et al. | 455/436 |
| 2002/0066011 | A1 * | 5/2002 | Vialen et al. | 713/150 |
| 2002/0137515 | A1 * | 9/2002 | Igarashi et al. | 455/436 |
| 2005/0202821 | A1 * | 9/2005 | Pischella | 455/436 |
| 2006/0067226 | A1 * | 3/2006 | Chandra et al. | 370/235 |
| 2008/0075035 | A1 * | 3/2008 | Eichenberger | 370/328 |
| 2010/0029290 | A1 * | 2/2010 | Barbaresi et al. | 455/450 |

* cited by examiner

*Primary Examiner* — Nick Corsaro
*Assistant Examiner* — Gerald Johnson
(74) *Attorney, Agent, or Firm* — Williams, Morgan & Amerson, P.C.

(57) ABSTRACT

The present invention provides methods for selecting a handover algorithm. The methods may include selecting the handover algorithm for a mobile unit based on at least one measurement indicative of a network state. The methods may also include receiving information indicative of the handover algorithm selected based on the measurement(s) indicative of the network state.

20 Claims, 4 Drawing Sheets

SELECTING A HANDOVER ALGORITHM

CROSS REFERENCE TO RELATED APPLICATIONS

This application is related to U.S. patent application Ser. No. 11/554,642, filed on Oct. 31, 2006.

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of cells, which may be grouped into one or more radio access networks. The coverage area of each cell in the wireless network is typically limited by the propagation loss of radio signals transmitted by base stations that provide coverage to the cell. Thus, the coverage area of each cell is determined by the location and the transmit power of the base station, as well as the topology of the cell and the location of any interfering objects. For example, the coverage area of a cell may be reduced if a building or a mountain is present near the base station. The boundaries of the cells are not rigidly defined and may vary with time. Thus, coverage areas may overlap such that multiple base stations may provide coverage to the overlapping regions, although the strength of the signal provided within the overlapping regions may be different for the different base stations.

Mobile units located in the coverage area of a cell may access the wireless communications system by establishing a wireless communication link with the base station associated to that cell. This is often referred to as the air interface. As discussed above, a mobile unit may be located in a region served by more than one base station. The mobile unit may then select the base station having the lowest propagation path loss (or highest channel quality) as the serving base station. Roaming mobile units may travel through regions served by numerous base stations. Accordingly, a roaming mobile unit may handover from one base station to another as it enters and leaves cells served by different base stations. Stationary mobile units may also handover from one base station to another if the propagation path loss (or channel quality) associated with the base stations varies over time.

Handover typically refers to a category of procedures that may be used to support mobility for mobile units in a cellular wireless network. For example, handover techniques may be used to allocate different radio resources for the existing connection as the mobile unit is handed over from one cell to another cell. When performing handover from one cell to another cell this generally means that different radio resources need to be allocated for this connection. In Code Division Multiple Access (CDMA) networks like the Universal Mobile Telecommunication System (UMTS), the basic radio resources are carrier frequencies, transmit power, and spreading codes. Due to the wide bandwidth of the carriers in UMTS systems, most network operators have only two or three carriers available for the entire network and, hence, carrier frequencies are often re-used in every base station. Many mobiles then need to share the same frequency band. The signals transmitted between the cells and mobile units are therefore distinguished by their spreading code. Signal separation using the spreading codes is maintained when moving between cells. Soft and/or softer handover techniques that permit a mobile unit to communicate concurrently with multiple base stations are typically applied when the mobiles travel through the network using the same frequency in every cell. Due to the fact that frequencies are not changed, soft and/or softer handover is also known as intra-frequency handover in UMTS.

Mobile units may also be handed off between cells that operate on different frequencies. For example, the Third generation Partnership Project (3GPP) standards for application in UMTS networks specify an inter-frequency handover. As mentioned above, most operators only have a few carrier frequencies available for their networks. One carrier is typically used to provide continuous coverage and basic services and the additional carriers are made available when needed, e.g., to provide coverage to larger network areas or to selected hotspots. Mobile units may therefore need to change carrier frequencies, i.e. to perform an inter-frequency handover within the multi-carrier system. Inter-frequency handovers typically occur when the load conditions on the two carriers change, e.g., the cells on one carrier might become overloaded. Inter-frequency handovers may also be used when the coverage areas of additional carriers are limited, e.g., the second and/or third carrier might be only used in hotspot areas. For example, mobile units using a hotspot carrier may be handed over to other carriers if traveling towards the border of the hotspot.

In some cases, mobile units may even be handed off between base stations in different wireless communication systems. For example, the 3GPP standards also specify inter-system (or inter-Radio Access Technology) handover for application in UMTS networks. One example of a handover between different radio access technologies (RAT) would be handover between a UMTS network and a network that operates according to the Global System for Mobile communication (GSM) standard. Many network operators have deployed both a UMTS network and a GSM network. The GSM networks have been deployed longer than UMTS networks and therefore the GSM networks most often offer nearly continuous nationwide coverage. In contrast, UMTS networks have (and are expected to continue to have) numerous coverage holes as operators concentrate on offering the new UMTS services in areas of relatively high population density. Inter-RAT handover is therefore a very critical feature in mixed technology networks. For example, mobile units traveling outside the UMTS coverage area will be dropped if they do not perform a handover to the GSM access technology, which may also cause customer satisfaction to fall.

Conventional handover techniques, whether soft, inter-frequency, or inter-RAT, rely on measurements performed by the mobile unit and/or the network. For example, each mobile unit may perform measurements based on signals transmitted between the mobile units and base stations that are currently connected to the mobile unit. Mobile units may also measure characteristics of transmission signals in potential target cells. In a UMTS network, the measurements may be used to determine whether a handover should be performed. Mobile units can perform the measurements for intra-frequency (soft) handover on the current cell and neighbor cells continuously because the base stations all use the same carrier frequency. The signals for different mobile units can be easily distinguished from each other by their different spreading codes.

However, mobile units may need to be tuned to new frequency bands to perform the measurements for inter-frequency or inter-RAT measurements on potential target cells. In many cases artificial transmission gaps may be introduced in the continuous UMTS signals to allow the mobile unit to perform measurements on different frequency bands. For example, the Compressed Mode (CM) has been specified in the 3GPP standards. One basic CM method (named SF/2) allows transmitting the same amount of data over the primary carrier frequency in half of the time by reducing the spreading factor by half, which leaves transmission gaps during the unused time. The mobile unit may therefore tune one or more receivers to other frequency bands and perform the required measurements during the transmission gaps. The mobile units then switch back to the original carrier to continue information transmission.

Compressed mode operations have a number of drawbacks. For example, signals with reduced spreading factors are more susceptible to noise and interference, so the signal power is typically increased during the compressed mode period to maintain signal quality. As a result, the compressed mode, and especially the SF/2 method, can cause significant power variations that result in higher interference levels and network capacity losses. Accordingly, conventional networks attempt to minimize usage of the compressed mode.

One alternative to performing handover measurements in the compressed mode is blind handover. With blind handover, the mobile unit does not perform any measurements on the target cells and therefore the compressed mode is not used. Inter-frequency or inter-RAT handover are triggered only by the mobile unit's measurements performed on the currently used carrier frequency. For example, blind handover might be initiated when the quality of the signals on the current carrier drops below a minimum threshold. However, no measurements will be performed on the target cells (either the other RAT or a different UMTS carrier) and so the best target cell and the signal quality on the new carrier cannot be determined. Target cells for blind handover therefore need to be specified before the blind handover is initiated. For example, a network operator may define a target cell, carrier frequency, and/or RAT for every cell where blind handover is to be used. Usually the most appropriate target cell(s) will be identified during network planning using cell planning data. The mobile unit will then be handed over to the predetermined target cell when blind handover is triggered, e.g., due to bad signal quality on the current carrier.

Blind handover and measurement-based handover algorithms are typically available in the same network and in the same cells at the same time. Thus, a handover algorithm must be selected once the need for an inter-frequency or inter-RAT handover has been identified for a mobile unit, e.g., if the mobile unit drives towards the edge of a coverage area of the serving cell. Quantifying the pros and cons of the different handover algorithms upfront is very difficult, if not impossible, and so conventional algorithm selection techniques implement predefined static selection rules that are conservative or defensive. For example, operators may enable or disable each algorithm separately for certain cells or a network area. For another example, if an operator wishes to restrict compressed mode usage in a certain area, but the mobile unit capabilities indicate that the compressed mode is needed to perform measurements on the target cells, then the operator may instruct the mobile unit to use a blind handover.

Conventional algorithm selection techniques are therefore inflexible and do not take into account the fact that both algorithm alternatives have their benefits, too. The conventional algorithm selection techniques also fail to take into account changing conditions that may affect the selection rules. For example, if the network load is low, then the application of compressed mode may not be an issue and therefore measurement-based may be preferable to blind handovers.

On the other hand, blind handover may be advantageous if one appropriate target cell can be identified, especially if the network load is high.

When a blind handover has been selected, the absence of target cell measurements in a blind handover may increase the danger that handover might be directed towards an inappropriate target cell, e.g. if the selection process has not been carried out carefully enough and the best target cells have not been selected. This would have a negative impact on the network performance and could also result in an increased handover failure or call drop rate. The use of fixed target cell definition may also be a drawback in many situations. First, the target cells for inter-RAT or inter-frequency handover need to be specified in advance, which means that the network and/or cell planning for the different network technologies (e.g., UMTS and GSM) needs to be coordinated. For example, GSM target cell(s) must be identified in advance for every UMTS cell. In the case of inter-frequency handover, cell planning for the two frequency layers must be coordinated. Different networks and/or frequency layers are traditionally planned independently, and so the coordination effort might be substantial. Second, the best target cell(s) will not be dynamically updated during the operational phase. However, the network layout will change regularly during the operational phase. Thus, existing cells may not be available at all times and new base stations that provide service to new cells may be installed. It would therefore be necessary to update the target cells for blind handover each time the network layout changes. This is a very time consuming and costly procedure.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for selecting a handover algorithm. The method may include selecting the handover algorithm for a mobile unit based on at least one measurement indicative of a network state. The methods may also include receiving information indicative of the handover algorithm selected based on the measurement(s) indicative of the network state.

BRIEF DESCRIPTION OF THE DRAWINGS

The invention may be understood by reference to the following description taken in conjunction with the accompanying drawings, in which like reference numerals identify like elements, and in which.

Figure 1:
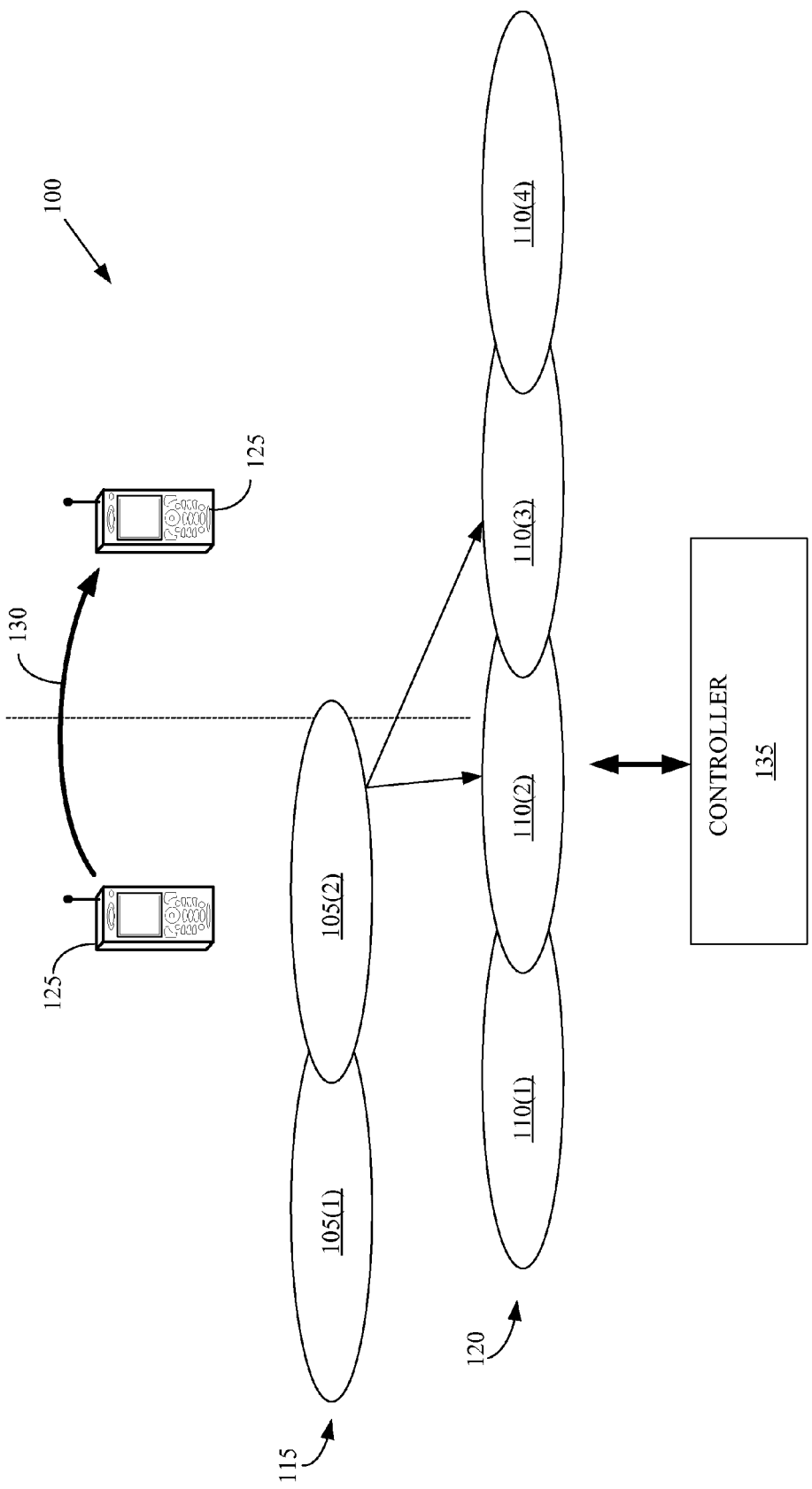
FIG. 1 conceptually illustrates a first exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the illustrated embodiment, the wireless communication system 100 provides wireless communication to a plurality of geographic areas or cells 105(1-2), 110(1-4). The numerical indices may be dropped when referring to the cells 105, 110 collectively. However, the numerical indices (1-2), (1-4) may be used to indicate individual cells 105, 110 and/or subsets of the cells 105, 110. This numbering convention may be applied to elements depicted in other figures and distinguished by different numerical indices. Persons of ordinary skill in the art having benefit of the present disclosure should appreciate that the wireless connectivity may be provided to the cells 105, 110 using one or more base stations, base station routers, access points, and the like, as well as controllers such as radio network controllers, although these entities and/or devices are not shown in FIG. 1. Persons of ordinary skill in the art having benefit of the present disclosure should also appreciate that the number of cells 105, 110 shown in FIG. 1 is intended to be illustrative and not to limit the present invention.

The cells 105, 110 are separated into layers 115, 120. In one embodiment, the layers 115, 120 are distinguished based upon the frequency or frequencies that are used as carrier frequencies used for providing wireless connectivity to the associated cells 105, 110. For example, in a wireless communication system 100 that operates according to UMTS standards and/or protocols, wireless connectivity may be provided to the cells 105 using a first carrier frequency and to the cells 110 using a second carrier frequency. In one alternative embodiment, the layers 115, 120 are distinguished based upon the radio access technology used to provide wireless connectivity to the associated cells 105, 110. For example, wireless connectivity may be provided to the cells 105 according to UMTS standards and/or protocols and wireless connectivity may be provided to the cells 110 according to GSM standards and/or protocols.

The wireless communication system 100 provides wireless connectivity to one or more mobile units 125. Only one mobile unit 125 is shown in the illustrated embodiment, however, persons of ordinary skill in the art having benefit of the present disclosure should appreciate that any number of mobile units 125 may operate within the wireless communication system 100. Persons of ordinary skill in the art having benefit of the present disclosure should also appreciate that the mobile units 125 may be referred to using other terms of art such as "user equipment," "mobile stations," "subscriber units," "subscriber stations," and the like. Exemplary mobile units 125 may include, but are not limited to, devices such as mobile telephones, personal data assistants, smart phones, Global Positioning System devices, wireless network interface cards, desktop or laptop computers, and the like.

The mobile unit 125 is capable of communicating with cells 105, 110 in either of the layers 115, 120. For example, the mobile unit 125 may be a UMTS-compatible device that is capable of communicating using any of the carrier frequencies provided by the wireless telecommunications system 100. For another example, the mobile unit 125 may include transceivers that are compatible with both UMTS and GSM standards, as well as any other frequency or radio access technology implemented by the wireless communication system 100.

The mobile unit 125 is initially associated with the cell 105(2) and therefore may access the wireless communication system 100 via the cell 105(2) and may receive information from the wireless communication system 100 via the cell 105(2). Techniques for transmitting information to the mobile unit 125 and/or receiving information from the mobile unit 125 over air interfaces established between the mobile unit 125 and the cell 105(2) are known to persons of ordinary skill in the art and an interest of clarity only those aspects of transmitting information over the air interface that are relevant to the present invention will be discussed further herein. The mobile unit 125 may then be handed over from the (serving) cell 105(2) to another (target) cell 105, 110. For example, a channel quality associated with the air interface between the mobile unit 125 and the cell 105(2) may degrade, which may result in the mobile unit requesting a handover. For another example, the mobile unit 125 may roam, as indicated by the arrow 130, resulting in the mobile unit 125 requesting a handover.

The mobile unit 125 may be handed over using either a blind handover algorithm or a measurement-based handover algorithm. As used herein and in accordance with usage in the art, the term "blind handover" will be understood to refer to a handover of the mobile unit 125 from a serving cell to a target cell that occurs without making measurements of characteristics of the newly established communication link (or the communication link that is about to be established) between the mobile unit 125 and the target cell. Blind handovers may also be referred to as inter-frequency handovers and/or inter-radio-access-technology handovers, depending on the frequencies and/or radio access technologies used by the cells 105, 110 involved in the blind handover. In contrast, the term "measurement-based handover" will be understood to refer to a handover of the mobile unit 125 from a serving cell to a target cell that is performed, at least in part, based on measurements of characteristics of the newly established communication link (or the communication link that is about to be established) between the mobile unit 125 and the target cell. Exemplary characteristics that may be measured during a measurement-based handover include, but not limited to, channel qualities, signal strengths, round-trip delays, and the like.

A controller 135 such as a radio network controller may select the handover algorithm used to hand over the mobile unit 125 based on one or more characteristics of the wireless communication system 100. Exemplary characteristics of the wireless communication system 100 that may be used for handover algorithm selection may include a handover failure rate, a network load, a number of target cells, and the like. For example, the controller 135 may select a measurement-based handover algorithm if the failure rate for blind handover becomes too high. For another example, the controller 135 may select a blind handover algorithm to avoid using the compressed mode if the network load becomes too high or the controller 135 may select a measurement-based handover algorithm at least in part to update and improve the statistical data if the network load is low. For yet another example, the controller 135 may select a blind handover algorithm if only few target cells were identified (e.g., 1 or 2) for the requested handover and a measurement-based handover algorithm may be selected if too many (e.g., 3 or more) target cells are identified, possibly indicating insecure target cell information. In other embodiments, the handover algorithm selection mechanism implemented in the controller 135 may use information collected during other measurement-based handovers, feedback information provided after executing blind and/or measurement-based handovers, and the like. The handover algorithm selection mechanism may also be individually adapted according to operator needs and desired functionality.

Figure 2:
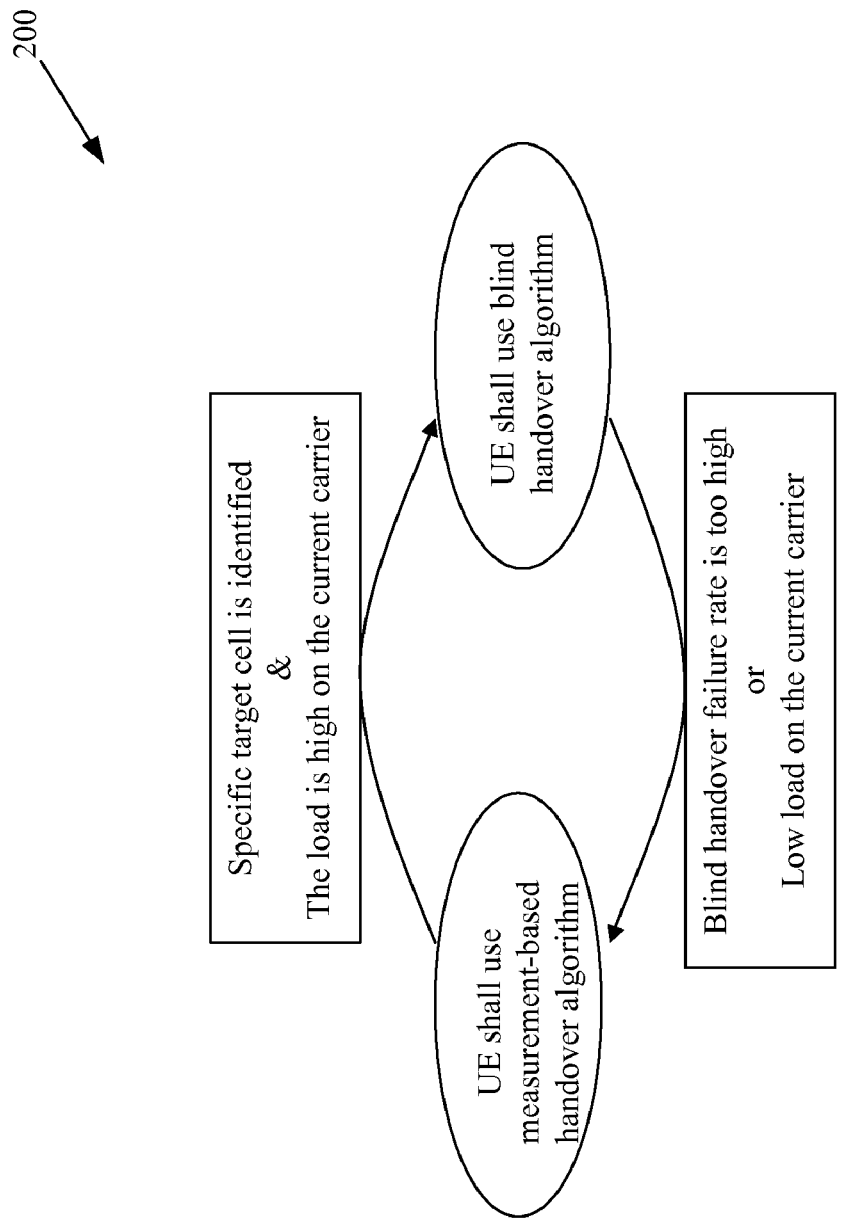
FIG. 2 conceptually illustrates one exemplary embodiment of an algorithm selection mechanism, in accordance with the present invention.

FIG. 2 conceptually illustrates one exemplary embodiment of an algorithm selection mechanism 200. In the illustrated embodiment, the algorithm selection mechanism 200 depicts specific criterion for determining what type of handover algorithm should be used when handing over a mobile unit (referred to as a UE, or user equipment, in FIG. 2) from a serving cell to a target cell. However, persons of ordinary skill in the art having benefit of the present disclosure should appreciate that the criterion shown in FIG. 2 are intended to be illustrative and not to limit the present invention. In alternative embodiments, other characteristics of the network, such as those described above and below, may be used instead of, or in addition to, the criterion shown in FIG. 2. The algorithm selection mechanism 200 is also assumed to be initiated in response to a trigger indicating handover of the mobile unit.

In the illustrated embodiment, the characteristics of the network include one or more target cells for the handover of the mobile unit, a blind handover failure rate, and the network load on the current carrier. If a specific target cell has been identified and the network load on the current carrier is relatively high (e.g., the network load exceeds a predetermined threshold), then the mobile unit may use a blind handover algorithm to perform the handover from the current serving cell to the identified target cell. Alternatively, if the blind handover failure rate is relatively high (e.g., the failure rate exceeds a predetermined threshold) and/or the network load on the current carrier is relatively low (e.g., the network load is below some predetermined threshold), then the mobile unit may use a measurement-based handover algorithm to perform the handover from the current serving cell to a target cell. In one embodiment, algorithm selection and target cell selection may be handled in a single generalized approach comparable to a neural network.

Figure 3:
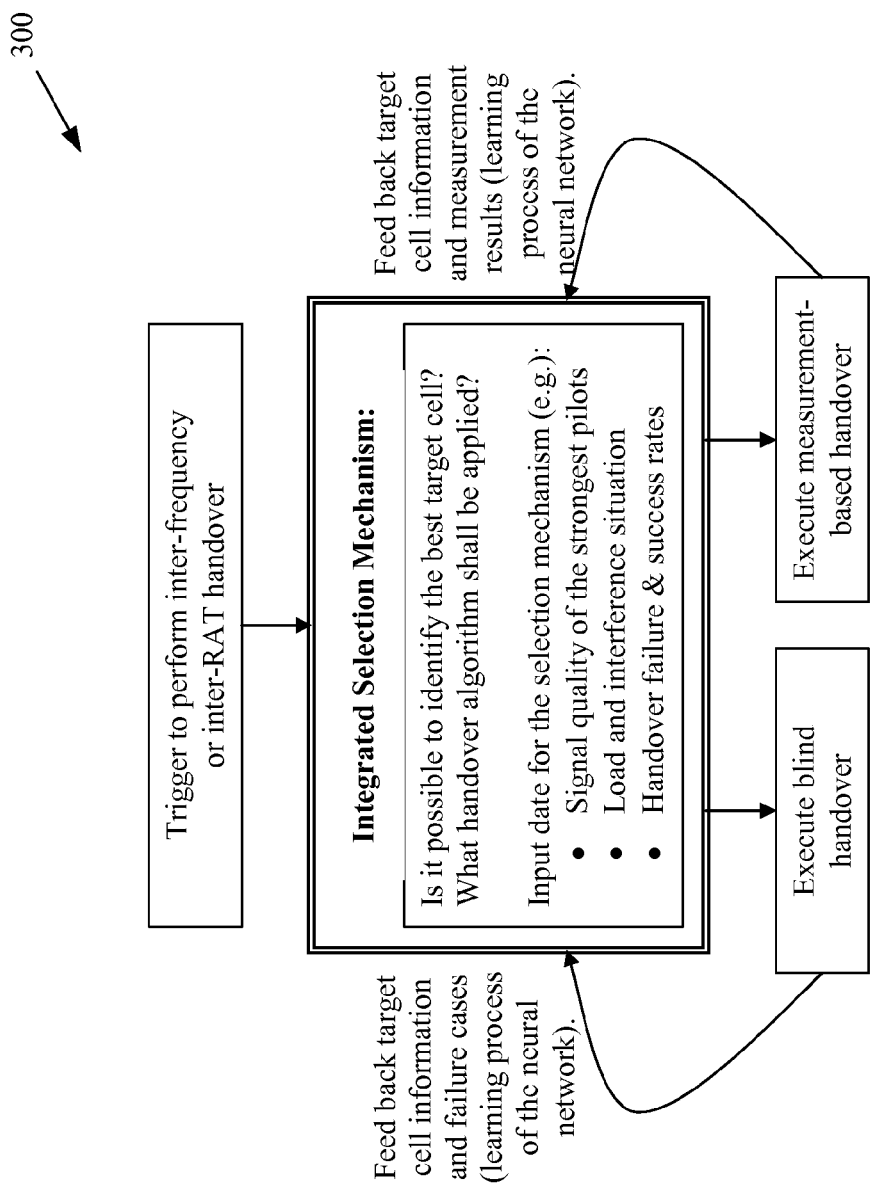
FIG. 3 conceptually illustrates one exemplary embodiment of a method for algorithm selection and target cell selection, in accordance with the present invention.

FIG. 3 conceptually illustrates one exemplary embodiment of a method 300 for algorithm selection and target cell selection. In the illustrated embodiment, a method 300 is initiated by a handover trigger, such as may be formed in response to a mobile unit approaching a coverage border of the current serving cell. The handover trigger may indicate that the mobile unit is to perform an inter-frequency handover and/or an inter-radio-access-technology handover. An integrated selection mechanism (which may be implemented in a controller such as a radio network controller using hardware, firmware, software, or a combination thereof) may then attempt to identify one or more target cells and select a handover algorithm based on information indicative of one or more characteristics of the network.

The information used to select the algorithm and/or select the target cell may include a mobile unit measurement report containing information about the current network constellation (e.g., the measurement results of the strongest pilots). The selection information may also include signal strengths of the strongest pilots, the current network load in the source cells, interference levels in the serving and/or target cells, and the failure rates for blind handover in the corresponding network area. However, persons of ordinary skill in the art having benefit of the present disclosure should appreciate that other or additional information may also be applied to the decision mechanism, such that the outcome might be different than with the input data listed above.

Statistical measures used for the selection process may be enhanced by taking into account the likelihood that each mobile unit may be in soft handover many times, or at least may be able to measure other strong pilot signals, and therefore may be able to acquire information that may be used for both target cell selection and handover algorithm selection. For example, when a mobile unit determines that it should perform a handover (e.g., the mobile unit approaches the coverage border of the serving cell) some or all of the information collected by the mobile unit during previous handovers and some or all of the information collected from the network may be accessed and used to select the algorithm and/or select the target cell (in case blind handover was selected).

Figure 4:
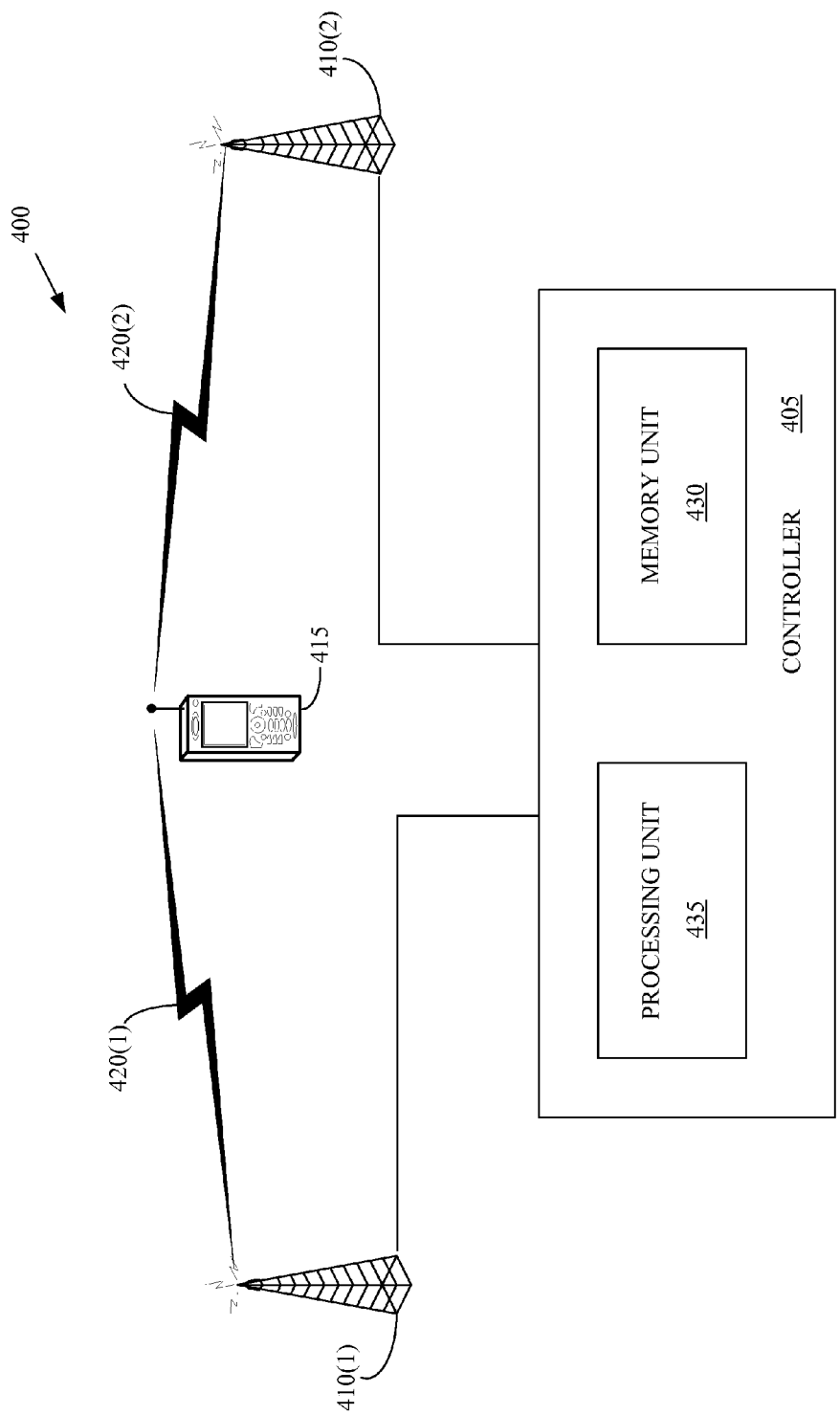
FIG. 4 conceptually illustrates a second exemplary embodiment of a wireless communication system, in accordance with the present invention.

FIG. 4 conceptually illustrates collection of measurement-based information during a handover in a second exemplary embodiment of a wireless communication system 400. In the illustrated embodiment, the wireless communication system 400 includes a controller 405, such as a radio network controller, that is communicatively coupled to base stations 410. Although two base stations 410 are shown in FIG. 4, persons of ordinary skill in the art having benefit of the present disclosure should appreciate that the communication system 400 may include any number of base stations 410. Among other functions, the controller 405 is configured to collect information indicative of one or more measurements performed during measurement-based handovers and to use this information to select target cells for blind handovers. In various alternative embodiments, the controller 405 may be implemented in hardware, firmware, software, or any combination thereof.

In the illustrated embodiment, a mobile unit 415 is being (or is about to be) handed over from the base station 410(1) to the base station 410(2). The mobile unit 415 has established communication links over air interfaces 420 with corresponding base stations 410 and so the mobile unit 415 may be said to be in soft handover. However, persons of ordinary skill in the art having benefit of the present disclosure should appreciate that is not necessary for the mobile unit 415 to be in soft handover. In alternative embodiment, the mobile unit 415 may be in hard handover, softer handover, or other types of handovers. The base stations 410 shown in FIG. 4 may transmit information using different carrier frequencies and/or according to different radio access technologies, such as UMTS, GSM, and the like.

The handover of the mobile unit 415 depicted in FIG. 4 is a measurement-based handover. Thus, the mobile unit 415 may perform measurements associated with both the serving base station 410(1) and the target base station 410(2). For example, the mobile unit 415 may transmit and/or receive pilot signals over the air interfaces 420 and use the signals to determine channel qualities, signal strengths, round-trip delays, and the like associated with the serving base station 410(1) and/or the target base station 410(2). Since the base stations 410 may transmit using different carrier frequencies and/or operate according to different radio access technologies, the mobile unit 415 may use a compressed mode to perform the measurements associated with the target base station 410(2). For example, the mobile unit 415 may implement the compressed mode SF/2, which allows transmitting the same amount of data over the primary carrier frequency in half of the time by reducing the spreading factor by half. The mobile unit 415 may therefore tune one or more receivers to other frequency bands and perform the required measurements during the transmission gaps.

The results of the measurements performed by the mobile unit during the measurement-based handover may be provided to the controller 405. In various alternative embodiments, the measurement results may be provided via either of the base stations 410 and in any form. The controller 405 may store information indicative of the results of the measurements in a memory unit 430, which may be an internal random access memory, a disk, a tape, or any other type of memory. Although the memory unit 430 is shown as an internal portion of the controller 405, persons of ordinary skill in the art having benefit of the present disclosure should appreciate that the present invention is not limited to internal memory units 430. In alternative embodiments, the information gathered during measurement-based handovers may be stored in external memory units, such as disks, tapes, memory elements mounted on remote computers, and the like. In some wireless communication systems 400, this information may be captured for performance analysis purposes that are not necessarily related to handovers.

The information indicative of the results of the measurements performed by any mobile unit 415 may be used to select target cells for blind handovers. In the illustrated embodiment, a processing unit 435 may access information associated with measurements performed during measurement-based handovers from the memory units 430 and use this information to select one or more target cells for a blind handover of the mobile unit. The information used to select the target cells may be provided by the mobile unit that is requesting the blind handover, but this is not required for the practice of the present invention. In some embodiments, the processing unit 435 may also select target cells for blind handovers using information provided by other mobile units, which are not currently requesting a blind handover, but have previously performed measurements during a measurement-based handover.

In one embodiment, the gathered information may include statistics collected for measurement-based handover, which the processing unit 435 may process and/or evaluate offline. Analyzing the handover statistics and then defining appropriate relationships between source cells and target cells may therefore replace conventional cell planning techniques for determining target cells for blind handover. For example, blind handover target cells may be selected based on network measurements that indicate the state of the network at approximately the time the handover is requested. Target cell selection may therefore be performed dynamically, which may increase the accuracy and reliability of the selection algorithm as well as reducing the requirements for cell-planning and increasing the handover success rate.

The target cell statistics for measurement-based handover may also be evaluated and analyzed online, e.g. by the processing unit 435. For example, a list of the best target cells for blind handover from each source cell may be updated each time a measurement-based handover is performed. The list of target cells may be stored in the memory units 430 or at any other location. The processing unit 435 may access the list to determine the best target cell(s) when a blind handover is requested. Such an adaptive mechanism may easily adapt to any changes in the network layout and configuration. For example, an adaptive mechanism using online evaluation of the measurement results and handover statistics may automatically adapt to new constellations that are formed when cells become temporarily unavailable and/or new base stations with new cells are added to the network.

Referring back to FIG. 3, handover of the mobile unit may then be executed along the lines of the outcome of the decision mechanism. For example, if the integrated selection mechanism identifies a target cell for a blind handover and selects the blind handover algorithm, the mobile unit may be handed over from the serving cell to the target cell using a blind handover. If the integrated selection mechanism selects a measurement-based handover algorithm, then the mobile unit may be handed over from the serving cell to a target cell using the measurement-based handover. In one embodiment, the target cell for the measurement-based handover may also be selected by the integrated selection mechanism.

The results of this process (e.g. actual measurement results, the selected target cell, handover success or failure, etc.) may be fed back to refine and improve the statistical data for the next handover events. In this way the decision mechanism can learn about the network conditions and the appropriate handover algorithms. Each handover event may therefore improve the statistics such that the decision mechanism may select the handover algorithm and/or target cell(s) for current network conditions in an optimal way. For example, the integrated selection mechanism may include a neural network that learns how to select target cells and/or handover algorithms based on the feedback information provided at the completion of each handover.

Embodiment of the techniques for selecting handover algorithms and/or target cells may have a number of advantages over conventional practice. In conventional handover selection algorithms, the target cell(s) for blind handover are performed during cell and/or network planning and this is typically a cumbersome process because different frequency bands and radio technologies are involved in inter-frequency and/or inter-RAT handovers. Embodiments of the handover selection algorithms and/or target cell selection algorithms described above may reduce effort required during the phase of network planning. For example, lists of target cell(s) may be automatically updated when the network layout changes, e.g. when new base stations with new cells are added to the network or a cell becomes temporarily (or permanently) unavailable. No re-planning with user interaction is required to update the target cell lists.

The handover failure rate may also be reduced if target cells for blind handover are determined in an adaptive way based on real network measurements. Effective usage of blind handover will yield better utilization of radio resources and blind handover performance by reducing usage of the compressed mode, which may increase network capacity. Adaptive selection of the handover mechanism may yield better network performance and a decreased handover failure rate. Furthermore, different handover algorithms might be needed when the network layout changes. The self-adaptive mechanisms described above may automatically select the appropriate handover algorithm in response to changes in the network layout.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving, at a controller, a handover trigger indicating that a mobile unit is handing off from a serving cell to at least one target cell;
   determining, at the controller and in response to the handover trigger, at least one of a blind handover failure rate or a network load; and
   selecting, at the controller, between a measurement-based handover algorithm and a blind handover algorithm for the mobile unit based on said at least one of the blind handover failure rate or the network load, said measurement-based handover algorithm being configured to perform handover of the mobile unit to said at least one target cell based on measurements of at least one characteristic associated with at least one communication link between the mobile unit and said at least one target cell.

2. The method of claim 1, wherein selecting the measurement-based handover algorithm or the blind handover algorithm comprises selecting the measurement-based handover algorithm when the determined blind handover failure rate is above a threshold.

3. The method of claim 1, wherein selecting the measurement-based handover algorithm or the blind handover algorithm comprises selecting the blind handover algorithm when the network load is above a threshold 4. The method of claim 1, wherein selecting the measurement-based handover algorithm or the blind handover algorithm comprises selecting the measurement-based handover algorithm or the blind handover algorithm based on at least one measurement performed during a previous measurement-based handover.

5. The method of claim 4, comprising:
   selecting the blind handover algorithm; and
   wherein selecting said at least one target cell comprises selecting a target cell for the blind handover based on said at least one of the blind handover failure rate or the network load and said at least one measurement performed during the previous measurement-based handover.

6. The method of claim 4, comprising:
   selecting the measurement-based handover algorithm; and
   selecting said at least one target cell for the measurement-based handover algorithm using measurements of at least one of a channel quality, a signal strength, and a round-trip delay associated with said at least one communication link.

7. The method of claim 1, comprising feeding back information indicative of the selection of the measurement-based handover algorithm or the blind handover algorithm for use in subsequent selections of the handover algorithm.

8. The method of claim 1, comprising performing handover of the mobile unit from the serving cell to the target cell using the selected measurement-based handover algorithm or the selected blind handover algorithm.

9. A method, comprising:
   receiving, at a mobile unit and from a controller, information indicative of a measurement-based handover algorithm or a blind handover algorithm selected by the controller based on at least one characteristic of a network state, said selection between the measurement-based handover algorithm and the blind handover algorithm being performed by the controller based on at least one of a blind handover failure rate or a network load determined by the controller in response to the controller receiving a handover trigger indicating that the mobile unit is handing off from a serving cell to at least one target cell, said measurement-based handover algorithm being configured to perform handover of the mobile unit to said at least one target cell based on measurements of at least one characteristic associated with at least one communication link between the mobile unit and said at least one target cell.

10. The method of claim 9, wherein receiving the information indicative of the measurement-based handover algorithm or the blind handover algorithm comprises receiving information indicative of a measurement-based handover algorithm or a blind handover algorithm selected based on at least one of a handover failure rate, a network load, and a number of target cells associated with a serving cell of the mobile unit.

11. The method of claim 9, comprising providing, from the mobile unit to the controller, a handover request, and wherein receiving the information indicative of the measurement-based handover algorithm or the blind handover algorithm comprises receiving the information indicative of the measurement-based handover algorithm or the blind handover algorithm in response to providing the handover request.

12. The method of claim 9, wherein receiving the information indicative of the measurement-based handover algorithm or the blind handover algorithm comprises receiving the information indicative of the measurement-based handover algorithm or the blind handover algorithm that is selected based on at least one measurement performed during a previous measurement-based handover.

13. The method of claim 12, comprising receiving information indicative of at least one target cell selected by the controller for the selected blind handover algorithm based on said at least one characteristic of the network state and said at least one measurement performed during the previous measurement-based handover.

14. The method of claim 12, wherein receiving information indicative of said at least one target cell comprises receiving information indicative of at least one target cell selected for use in the measurement-based handover algorithm.

15. The method of claim 1, comprising performing a handover of the mobile unit from the serving cell to said at least one target cell using the selected handover algorithm.

16. A method, comprising:
receiving, at a controller, a handover trigger indicating that a mobile unit is handing off from a serving cell to at least one target cell;
determining, at the controller in response to the handover trigger, a failure rate for blind handovers; and
selecting, at the controller, between a measurement-based handover and a blind handover by comparing the failure rate for blind handovers to a first threshold.

17. The method of claim 16, wherein selecting between the measurement-based handover and the blind handover comprises selecting the blind handover algorithm for the mobile unit when the failure rate for blind handovers exceeds the first threshold.

18. The method of claim 17, wherein selecting the blind handover algorithm comprises selecting the blind handover algorithm when a network load on a current carrier is below a second threshold.

19. The method of claim 16, wherein selecting between the measurement-based handover in the blind handover comprises selecting the measurement-based handover algorithm when the failure rate for blind handovers is less than or equal to the first threshold.

20. The method of claim 16, comprising determining the failure rate for blind handovers for use in subsequent selections of the handover algorithm using feedback information indicative of the selection of the measurement-based handover algorithm or the blind handover algorithm.

* * * * *